United States Patent [19]

Bruinsma

[11] 3,748,377

[45] July 24, 1973

[54] CIRCUIT ARRANGEMENT FOR PRODUCING AN UNAMBIGUOUS MARKER IN A TELEVISION IMAGE

[75] Inventor: Anne Hendrik Bruinsma, Emmasingel, Eindhoven, Netherlands

[73] Assignee: U.S. Philips Corporation, New York, N.Y.

[22] Filed: Mar. 1, 1972

[21] Appl. No.: 231,053

Related U.S. Application Data

[63] Continuation of Ser. No. 23,327, March 27, 1970, abandoned.

[52] U.S. Cl. .......................... 178/5.4 R, 178/DIG. 6

[51] Int. Cl. .............................................. H04n 5/00

[58] Field of Search ................. 178/DIG. 6; 307/265

[56] References Cited

UNITED STATES PATENTS

| | | | |
|---|---|---|---|
| 2,784,247 | 3/1957 | Hurford | 178/DIG. 6 |
| 2,595,646 | 5/1952 | Doba, Jr. et al. | 178/DIG. 6 |
| 2,825,755 | 3/1958 | Baracket | 178/DIG. 6 |
| 3,257,506 | 6/1966 | Siepmann | 178/DIG. 6 |
| 3,465,097 | 9/1969 | Brabon et al. | 178/DIG. 6 |
| 3,602,646 | 8/1971 | Goldberg | 178/5.4 R |
| 3,045,187 | 7/1962 | Belcastro | 307/265 |
| 3,048,714 | 8/1962 | Poole | 307/265 |
| 3,050,639 | 8/1962 | Tate | 307/265 |
| 3,214,602 | 10/1965 | Heyning et al. | 307/265 |
| 3,244,909 | 4/1966 | Henderson | 307/265 |

*Primary Examiner*—Robert L. Griffin
*Assistant Examiner*—George G. Stellar
*Attorney*—Frank R. Trifari

[57] ABSTRACT

A circuit arrangement for producing a marker in a television image. The circuit arrangement is provided with a line and field pulse generator of adjustable pulse duration and synchronized at the line and field frequencies, which generators are connected to a line and a field pulse shaper which series arrangements of pulse generator and pulse shaper are coupled together through a gating circuit by means of which a series of line frequency pulses occurring at field frequency is produced. The line pulse shaper is formed with at least two series-arranged square-wave signal generators of varying pulse duration and for obtaining said variation a second input of each square-wave signal generator is coupled to the field pulse shaper providing a signal varying as a function of time.

9 Claims, 9 Drawing Figures

Figure 1:
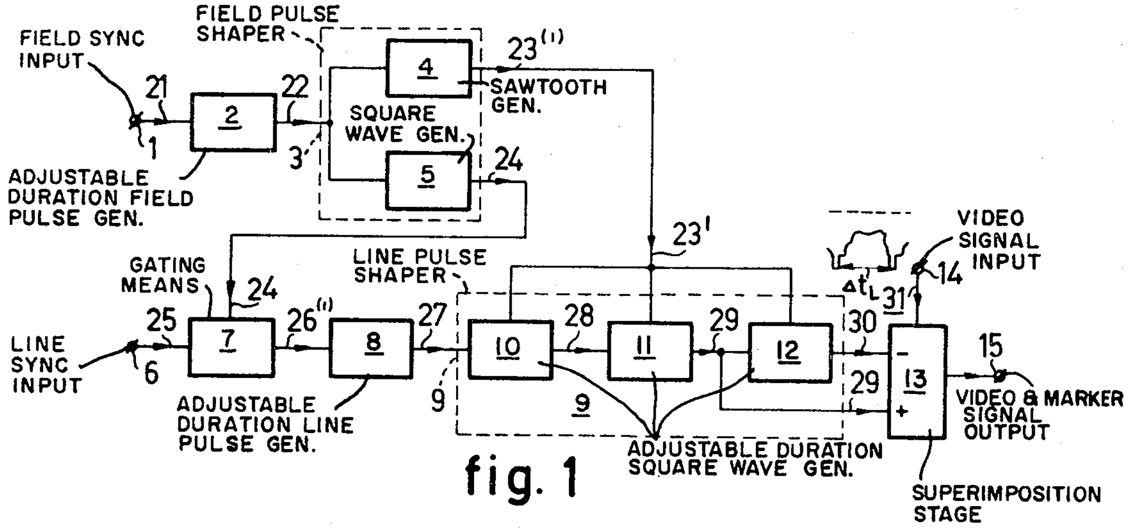

INVENTOR.
ANNE H. BRUINSMA
BY
Frank R. Trifari
AGENT

INVENTOR.
ANNE H. BRUINSMA
BY
AGENT

INVENTOR.
ANNE H. BRUINSMA
BY
[signature]
AGENT

INVENTOR.
ANNE H. BRUINSMA

BY [signature]

AGENT

CIRCUIT ARRANGEMENT FOR PRODUCING AN UNAMBIGUOUS MARKER IN A TELEVISION IMAGE

This is a continuation, of application Ser. No. 23,327, filed Mar. 27, 1970 now abandoned.

The invention relates to a circuit arrangement for producing a marker in a television image to which end a marker signal is generated which is superimposed in a superimposition stage on a line and field-generated video signal, which circuit arrangement is provided with two pulse generators having an adjustable pulse duration, a field synchronizing signal being applied to one pulse generator and a line synchronizing signal being applied to the other, which field and line pulse generators are connected to field and line pulse shapers, respectively, which under the excitation of the relevant pulse generator having an adjustable pulse duration produce relatively short pulses, the series arrangements of pulse generator and pulse shaper being coupled together through a gating circuit so that the marker signal applied to the superimposition stage comprises a series of line frequency pulses occurring at field frequency.

Such a circuit arrangement is known from U.S. Pat. specification No. 2,784,247. There is described that the two series arrangements of pulse generator and pulse shaper are each connected to an input of the gating circuit formed as a coincidence circuit. The pulse shapers are formed as differentiating circuits. The time constants of these circuits are different, the time constant of the line pulse shaper being short relative to that of the field pulse shaper. The gating circuit provided with a threshold is switched by the differentiated trailing edges of the pulse generated by the line and field pulse generators having an adjustable pulse duration. The result is that a marker signal is applied to the superimposition stage succeeding the gating circuit, which marker signal is built up from a series of line frequency pulses occurring at field frequency. The line frequency pulses in the series which is added to the video signal produce a local reduction or enlargement of the image content of the video signal dependent on the direction. The marker signal consequently becomes manifest as an optionally black or white marker in the television image on a display screen of a television receiver.

The marker may be displaced in the television image by varying the pulse duration of the pulses generated by the line and field pulse generators. A simple possibility of displacing the marker in the television image may be obtained by coupling together the adjusting members of the line and field pulse generators to form one member which is formed, for example, with two mechanically coupled potentiometers.

There is described that the adjusted pulse duration of the line frequency pulses is constant in the series occurring at field frequency so that the marker in the television image has the form of a rectangle. The rectangle extends in the line deflection direction or at right angles thereto as a function of the difference in the time constants of the differentiating circuits in the line and field pulse shapers. There is proposed to produce an oblique parallellogram as a marker by varying the pulse duration of the pulse generated by the line pulse generator during the pass period of the gating circuit determined by the field pulse shaper. The manner in which this can be carried into effect is not described.

It is found that a marker having the shape of a rectangle positioned either horizontally or vertically or an oblique parallelogram may be produced with the known arrangement. It will be evident that an unambiguous indication of a detail in a television image is impossible with a square-shaped marker.

An object of the present invention is to provide a circuit arrangement by which a marker can be produced in a television image and by which a detail in said image can be indicated in a completely unambiguous manner. Particularly indicated is an arrow as a marker. To this end the circuit arrangement according to the invention is characterized in that the line pulse shaper is formed with at least two series-arranged square-wave signal generators having a varying pulse duration and that for obtaining said variation a second input of each square-wave signal generator is coupled to the field pulse shaper providing a signal varying as a function of time.

A further object of the invention is to provide a circuit arrangement by which the marker which becomes clearly manifest throughout the image can be produced in a monochrome television image having bright and dark portions or in a colour television image without converting the marker signal added to the video signal. To this end a circuit arrangement according to the invention is characterized in that the line pulse shaper is formed with three series-arranged square-wave signal generators having a varying pulse duration, the outputs of the last two generators of said series arrangement being coupled to the superimposition stage.

Figure 2:
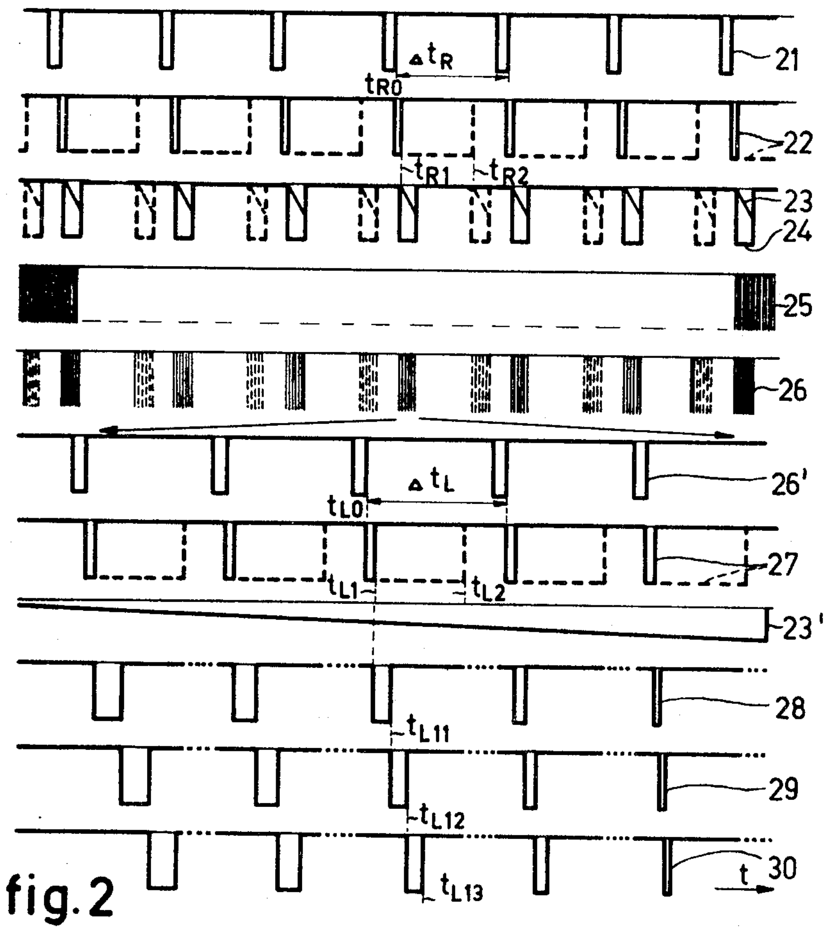
Figure 3:
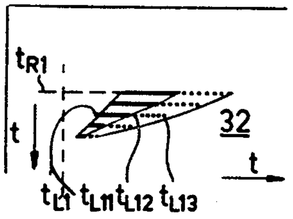
Figure 4:
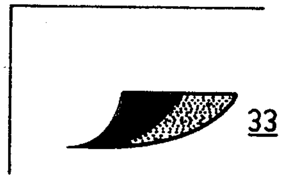

In order that the invention may be readily carried into effect a few embodiments thereof will now be described in detail by way of example with reference to the accompanying diagrammatic drawings in which:

FIG. 1 shows a block diagram of an embodiment of a circuit arrangement according to the invention, FIG. 2 shows for explanation of the circuit arrangement according to FIG. 1 a few signals occurring in said circuit arrangement, FIGS. 3 and 4 show markers produced in a television image with the aid of a circuit arrangement according to FIG. 1.

Figure 5:
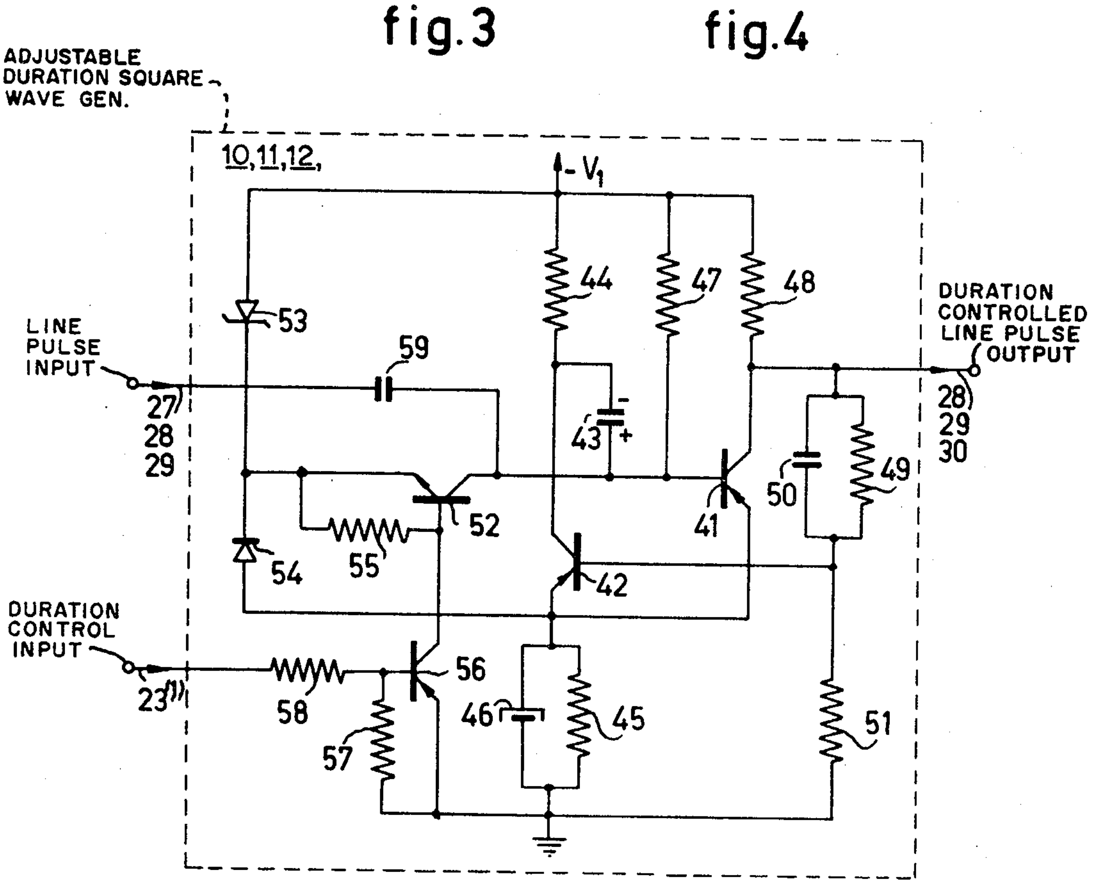
Figure 6:
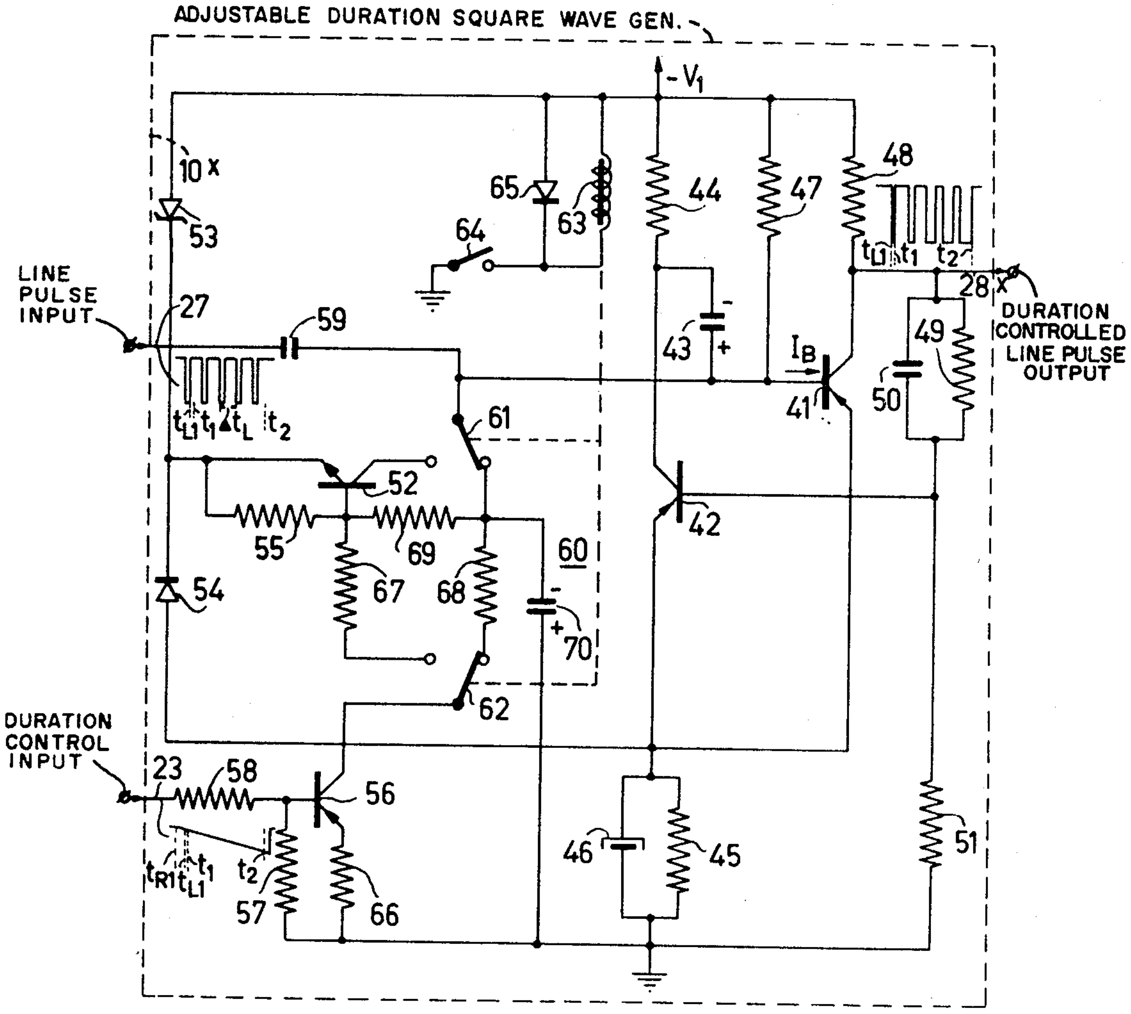
Figure 7:
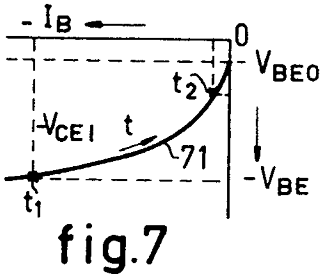
Figure 8:
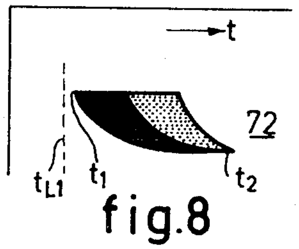
Figure 9:
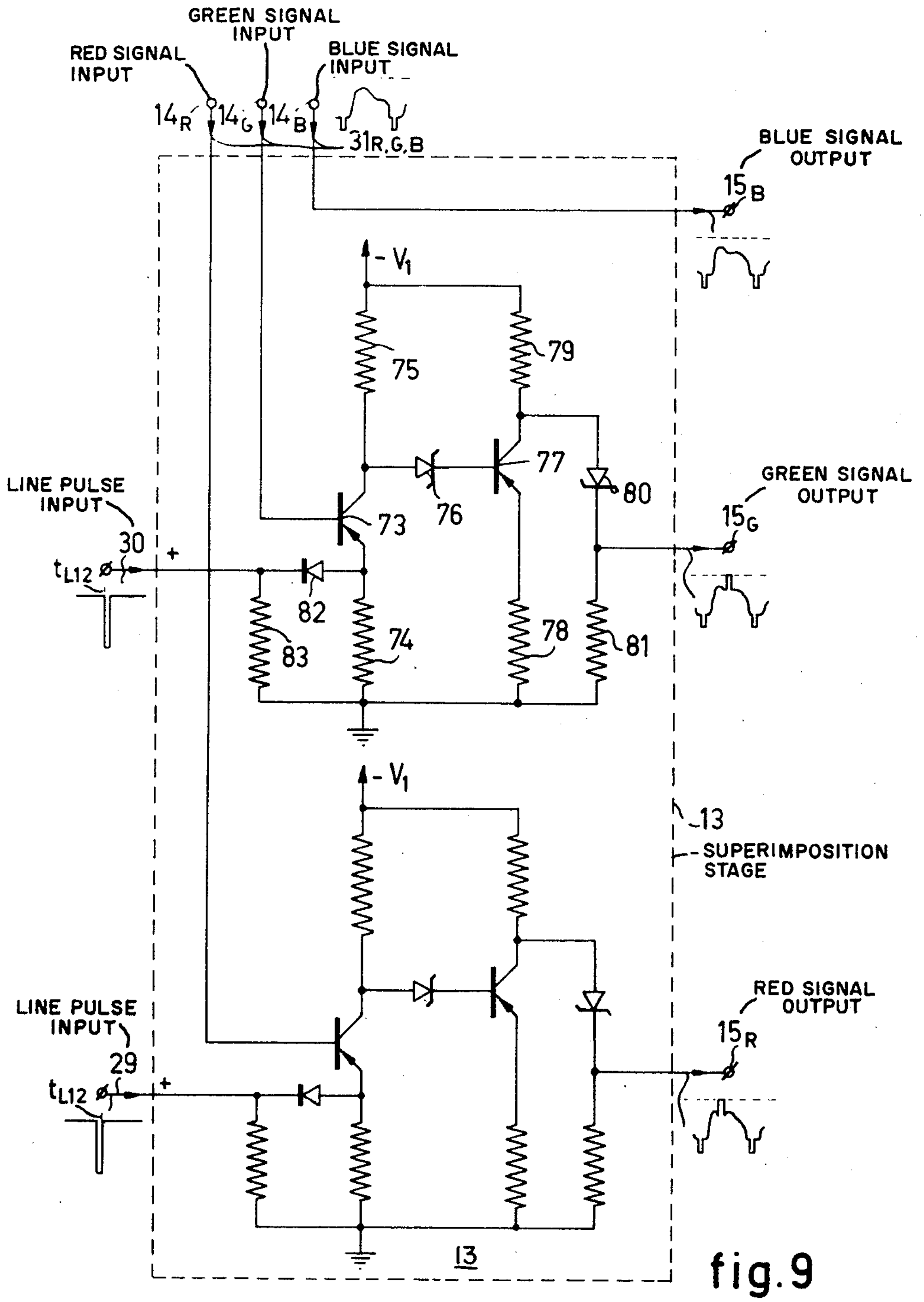

FIG. 5 shows an embodiment of blocks which are essential to the invention and are used in the circuit arrangement according to FIG. 1, FIG. 6 shows a modified embodiment of one of the blocks shown in FIG. 5, FIG. 7 shows a transistor characteristic of a transistor used in the block according to FIG. 6, FIG. 8 shows a marker produced in a television image with the aid of the block according to FIG. 6, FIG. 9 shows an embodiment of a block used in the circuit arrangement according to FIG. 1 which circuit arrangement is suitable for use in a colour television system.

A circuit arrangement according to the invention shown block-diagrammatically in FIG. 1 will be described with reference to the signals occurring in the circuit arrangement and shown in FIG. 2 as a function of time $t$. In FIG. 1 the reference numeral 1 denotes an input terminal of the circuit arrangement which terminal is connected to a pulse generator 2 having an adjustable pulse duration. A signal 21 shown in FIG. 2 is applied through input terminal 1 to the pulse generator 2. Signal 21 represents a field synchronizing signal associated with a television system wherein periodically occurring trailing field synchronizing pulses occur. One of the field periods is denoted by $\Delta t_R$ in signal 21. The commencement of a field period is denoted by $t_{RO}$ which periodically occurring instant is considered to coincide with the end of each field synchronizing pulse.

The signal 21 excites the generator 2 so that this generator provides a signal 22. The signal 22 comprises pulses occurring at field frequency which commence at the instant $t_{RO}$ and have a given pulse duration dependent on the adjustment of the generator 2. Short pulses which cover the period from the instant $t_{RO}$ to an instant $t_{R1}$ are shown by solid lines in signal 22. Broken lines denote that a long pulse duration may also occur, namely, for example, up to an instant $t_{R2}$.

The generator 2 applies the signal 22 to a field pulse shaper 3. The field pulse shaper 3 is formed with a sawtooth pulse generator 4 and a square-wave signal generator 5 the inputs of which are connected to the output of the generator 2. The sawtooth pulse generator 4 provides a signal 23 while the generator 2 is excited. The signal 23 is shown in FIG. 2 and it comprises short sawtooth pulses occurring at field frequency. The signal 23 is also denoted by 23$^1$ in FIG. 2, but in this Figure it is shown on a different time scale. The use of the signal 23$^{(1)}$ will be apparent from the following description.

The square-wave signal generator 5 excited by the generator 2 provides a signal 24. The signal 24 comprises short square-wave signals occurring at field frequency. Solid and broken lines denote that the signals 23 and 24 comprise pulses having a constant pulse duration during which the initial instant can be shifted from, for example, the instant $t_{R1}$ to the instant $t_{R2}$ with the aid of the pulse generator 2.

A signal 25 is applied to a second input terminal of the circuit arrangement denoted by the reference numeral 6. The signal 25 represents a line synchronizing signal associated with a television system wherein trailing line synchronizing pulses occur periodically. The input terminal 6 is connected to an input of a gating circuit 7 wherein the square-wave signal generator 5 is connected to a different input. The gating circuit 7 is active as a coincidence circuit so that the gating circuit 7 passes on a signal denoted by the reference numeral 26 by means of combination of the signals 24 and 25. The series of the passed-on line synchronizing pulses occurring at field frequency are shown by solid and broken lines in signal 26. It is achieved with the aid of the variation in the adjustment of the field pulse generator 2 that a series of line synchronizing pulses can be chosen in a desired part of each field period $\Delta t_R$ from the line synchronizing signal 25. To maintain FIG. 2 simple, signal 26 indicates that a series of five line synchronizing pulses is passed on by the gating circuit 7. In a practical embodiment of the circuit arrangement, for example, several tens of line synchronizing pulses can be passed on.

To explain the operation of the circuit arrangement, FIG. 2 shows the signal 26 on a different time scale as a signal 26$^1$. The signal 26$^1$ represents one series of the line synchronizing pulses which are passed on by the gating circuit 7. One line period is denoted by $\Delta t_L$ while the commencement of a periodically occurring line period is denoted by $t_{L0}$.

The gating circuit 7 applies the signal 26$^{(1)}$ to a pulse generator 8 having an adjustable pulse duration which provides a signal 27. The pulse generator 8 is formed similarly as the pulse generator 2, but pulse generator 8 provides pulses having an adjustable pulse duration and occurring at line frequency and pulse generator 2 provides pulses at field frequency. The generators 2 and 8 may therefore be indicated as field pulse generator and line pulse generator, respectively. A few instants $t_{L1}$ and $t_{L2}$ are shown in the signal 27 for one line period $\Delta t_L$ in a comparable manner as shown in the signal 22 for one field period $\Delta t_R$.

The signal 27 is applied by the pulse generator 8 to a line pulse shaper 9. According to a feature of the invention the line pulse shaper 9 is formed with three series-arranged square-wave signal generators 10, 11 and 12 having a varying pulse duration and being formed in, for example, the same manner. The signal 23$^{(1)}$ provided by the sawtooth pulse generator 4 is applied to a second input of each square-wave signal generator 10, 11 or 12.

The square-wave signal generator 10 is excited by the pulse generator 8 providing the signal 27. To simplify the explanation of the operation of the circuit arrangement the starting point is the signal 27 shown by solid lines wherein the trailing edges of the pulses occur at the periodically occurring instant $t_{L1}$. If the sawtooth pulsatory signal 23$^1$ would not be applied to the square-wave signal generator 10 this generator would generate a square-wave signal occurring at line frequency under the excitation of the signal 27 provided by the pulse generator 8 which square-wave signal is comparable with the square-wave signal 24 occurring at field frequency. The sawtooth pulsatory signal 23$^1$, however, results in a square-wave signal of varying pulse duration and occurring at line frequency being produced instead of a square-wave signal of constant pulse duration and occurring at line frequency. The reference numeral 28 in FIG. 2 denotes a signal produced by the square-wave signal generator 10 of FIG. 1 in which signal the pulse duration of the square-wave signals decreases. The time axis in signal 28 and in the signals further to be shown in FIG. 2 is shown in an interrupted manner so as to indicate that the highest value of the pulse duration of a square-wave signal small relative to the line period $\Delta t_L$. The trailing edge of a third square-wave signal in a series of five square-wave signals is denoted at an instant $t_{L11}$ in the signal 28.

The square-wave signal generator 11 of varying pulse duration is excited by the square-wave signal generator 10 providing the signal 28. As a result the square-wave signal generator 11 which is formed, for example, in the same manner as generator 10 will produce a signal 29. The signal 29 substantially equivalent to the signal 28, but is delayed relative thereto. The trailing edge of the third square-wave signal in signal 28 occurring at the instant $t_{L11}$ coincides with the leading edge of the third square-wave signal in signal 29, while the trailing edge thereof occurs at an instant $t_{L12}$.

The square-wave signal generator 12 of varying pulse duration is excited by the square-wave signal generator 11 providing the signal 29. In the manner as described above the square-wave signal generator 12 will provide a signal 30 which is equivalent to the signals 28 and 29. The trailing edge of the third square-wave signal in the signal 30 occurs at an instant $t_{L13}$. For only a small variation in the signal 23$^1$ during the said square-wave signals in the signals 28, 29 and 30 it can be stated that the time $t_{L1}$ to $t_{L11} = t_{L11}$ to $t_{L12} = t_{L12}$ to $t_{L13}$.

FIG. 1 shows that the line pulse shaper 9 provides the signals 29 and 30 for further handling in the circuit arrangement. The signals 29 and 30 are applied to a superimposition stage 13. The superimposition stage 13 is connected to an input terminal 14 of the circuit arrangement to which a video signal 31 is applied which signal is shown at this terminal. The line synchronizing pulses and the picture content extending above the black level are shown in the video signal 31 which is shown for approximately one line period $\Delta t_L$. A broken line in the video signal 31 indicates the maximum value of the picture content, that is to say, the white level. A plus and a minus symbol shown at the superimposition stage 13 indicate that the signal 29 with square-wave signals shown in FIG. 2 is added in the same direction (+) and that the signal 30 with square-wave signals is added in the opposite direction (−) to the video signal 31. A video signal not shown occurs at an output terminal 15 of the circuit arrangement connected to the superimposition stage 13 in which video signal the signals 29 and 30 which are mutually in phase opposition i.e. have opposite polarities occur as marker signals. The result is that the signal 29 brings the picture content in the video signal 31 locally to black level, whereas the signal 30 brings this content adjacent locally to white level.

A marker signal (29–30) is produced with the aid of the circuit arrangement according to FIG. 1 which signal, superimposed on an arbitrary video signal, produces upon display on a display screen of a television receiver a marker 32 in a television image which marker is shown diagrammatically in FIG. 3. FIG. 3 shows by way of two lines at right angles to each other the edges of a television display screen. The instants $t_{L1}$, $t_{L11}$, $t_{L12}$ and $t_{L13}$ are plotted along a time axis $t$. The line deflection takes place in this direction. At right angles thereto, in the field deflection direction, a time axis $t$ with the instant $t_{R1}$ is shown. The instants $t_{R1}$ and $t_{L1}$ are adjusted with the aid of the field pulse generator 2 and the line pulse generator 8, respectively, of adjustable pulse duration shown in FIG. 1.

As is shown in FIG. 2 the marker signal (29–30) is considered to cover five line periods $\Delta t_L$. To explain the marker 32 in FIG. 3 the third line period is considered likewise as in the description of the signals 28, 29 and 30 of FIG. 2. From the instant $t_{L1}$ to the instant $t_{L11}$ no marker signal (29–30) is provided by the line pulse shaper 9 of FIG. 1. From the instants $t_{L11}$ to $t_{L12}$ the signal 29 (black level) becomes manifest in the marker signal (29–30). The marker 32 therefore shows in a television image a black stripe represented by a fat solid line in FIG. 3. From the instants $t_{L12}$ to $t_{L13}$ the signal 30 (white level) becomes manifest in the marker signal (29–30). A white stripe shown by a dotted line in FIG. 3 appears in the marker 32. The decreasing pulse duration of the square-wave signals in the signals 28, 29 and 30 results in the length of the said stripes decreasing and in the stripes being displaced in the direction of line deflection towards the given edge of the screen. In this manner a marker 32 occurring as a slanting arrow appears in the television image which arrow is divided lengthwise in a black and a white portion.

If the picture content in the video signal 31 shows a grey tinted scene upon display on a display screen, both the black and the white arrow in the marker 32 become manifest in the television image. In a very darkly tinted image the white arrow only will become clearly manifest. In a bright picture the black arrow in the marker 32 has the indicating function.

It is apparent from the foregoing that it is alternatively possible to form the line pulse shaper 9 of FIG. 1 with only two square-wave signal generators, for example, 10 and 11. The signal 29 provided by the square-wave signal generator 11 with square-wave signals of varying pulse duration and occurring at line frequency results in the black arrow only in the marker 32 at the indicated superimposition on the video signal 31. For obtaining a clear indication in an image having great white-black contrasts the circuit arrangement must be provided with a black-white switch for the marker 32 by which switch the phase of the signal 29 can be inverted.

The description of FIG. 1 states that the signal 23 provided by the pulse shaper 3 has a short sawtooth pulse occurring at field frequency. The linearly varying variation in the pulses in the signal 23 produces upon display of the marker signal (29–30) a marker 32 which has the shape of an arrow having two straight extending sides which meet in one point. If a non-linearly varying variation of the pulses in the signal 23 occurs, the shape of the arrow-like marker 32 changes.

FIG. 4 shows a comma-shaped marker 33 which can be obtained, for example, with the aid of a variation in according with an *e*-power of the pulses in the signal 23. In this case it is possible to derive the signal 23 from the square-wave signal generator 5 which is formed, for example, as a monostable multivibrator including an alternately charged and discharged capacitor. The voltage variation across the said capacitor may produce the signal 23.

It is possible to vary the pulse duration of the square-wave signals provided by the generators 10, 11 and 12 after the pulse shaper 9 has already produced for some time a marker signal including pulses of constant duration. The result is that a marker is produced in a television image which marker comprises a rectangle and a slanting arrow.

In the circuit arrangement according to FIG. 1 the series arrangement of the line pulse generator 8 of adjustable pulse duration and the line pulse shaper 9 is connected between the gating circuit 7 and the superimposition stage 13. The signals 24 and 25 which comprise square-wave signals occurring at field frequency and line synchronizing pulses of constant pulse duration, respectively, are applied to the gating circuit 7. The result is that only the desired series of several tens of line synchronizing pulses for each field period excites the line pulse generator 8. If, as in the said U.S. Patent Specification, gating circuit 7 would succeed the series arrangement of the line pulse generator 8 and the line pulse shaper 9, each line synchronizing pulse in signal 25 would excite the pulse generator 8. Apart from the needless action of the pulse generator 8 the gating circuit 7 should have a high quality for the purpose of blocking the unwanted line synchronizing pulses. By rendering the trigger sensitivity of the pulse generator 8 comparatively weak in the circuit arrangement described in FIG. 1, it is ensured that even when using a simple gating circuit 7 of less quality the unwanted line synchronizing pulses which have been passed on at a smaller amplitude cannot excite the pulse generator 8.

The circuit arrangement according to FIG. 1 may be used in a television system both at the transmitter end and at the receiver end.

FIG. 5 shows a possible embodiment of the square-wave signal generators 10, 11 and 12 in the line pulse shaper 9 of FIG. 1 which generators are essential to the invention. The signal 27, 28 or 29 shown in FIG. 2 is applied as a trigger signal to the square-wave signal generator 10, 11 or 12 while, for example, the sawtooth pulsatory signal $23^{(1)}$ is applied to each square-wave signal generator. The square-wave signal generator 10, 11 or 12 thus provides the signal 28, 29 or 30 shown in FIG. 2. Since all this does not make any difference for the construction of the generators, only the square-wave signal generator 10 will be referred to in the description of FIG. 5.

In FIG. 5 the reference numerals 41 and 42 denote two transistors the emitter electrodes of which are connected together in a square-wave signal generator 10 formed as a monostable multivibrator. The transistors 41 and 42 shown are of the pnp-type but they may be alternatively of the npn-type. The same or the opposite applies to further transistors to be referred to. A collector electrode of transistor 42 is connected through a capacitor 43 and a resistor 44 to a base electrode of the transistor 41 and a terminal $-V_1$, respectively. A terminal of the capacitor 43 connected to the base electrode of the transistor 41 is denoted by a plus symbol and the other terminal is denoted by a minus symbol. The supply of charge at a given polarity to the similarly denoted terminal of the capacitor 43 will be referred to as charging. The removal will be referred to as discharging.

The terminal $-V_1$ forms part of a supply source $V_1$ not shown another terminal of which is considered to be connected to ground. The interconnected emitter electrodes of the transistors 41 and 42 are connected to ground for obtaining a bias through a parallel arrangement of a resistor 45 and a capacitor 46. The base electrode and a collector electrode of the transistor 41 are connected to the terminal $-V_1$ through resistors 47 and 48, respectively. The collector electrode of the transistor 41 is connected to a parallel arrangement of a resistor 49 and a capacitor 50 which parallel arrangement is connected to ground through a resistor 51. The resistors 49 and 51 constitute a potential divider a tap of which is connected to a base electrode of the transistor 42.

The junction of the base electrode of the transistor 41 and the capacitor 43 is connected to a collector electrode of an npn-transistor 52. An emitter electrode of transistor 52 is connected to a junction in a series arrangement of a Zener diode 53 and a diode 54. An anode of the diode 54 is connected to the interconnected emitter electrodes of the transistors 41 and 42. An anode of the Zener diode 53 is connected to the terminal $-V_1$. A base electrode of transistor 52 is connected through a resistor 55 to the emitter electrode thereof. The base electrode of transistor 52 is connected to a collector electrode a pnp transistor 56 an emitter electrode of which is connected to ground. A base electrode of the transistor 56 is connected to ground through a resistor 57 and is coupled through a resistor 58 to an input to which the signal $23^{(1)}$ serving as a control signal is applied. The square-wave signal generator 10 is formed with a second input to which the signal 27 serving as a trigger signal is applied which input is coupled through a capacitor 59 to the base electrode of the transistor 41. The output of the square-wave signal generator 10 conveying the signal 28 is coupled to the collector electrode of the transistor 41.

To explain the operation of the square-wave signal generator 10 formed as a monostable multivibrator circuit the starting point is the stable stage. In its stable state the transistor 41 is saturated which has charged the capacitor 43 by means of emitter-base current. The transistor 42 is cut off because under the influence of the voltage division across the resistors 49 and 51 the voltage at the base electrode thereof is less negative than the bias impressed on the emitter electrode with the aid of the resistor 45 and the capacitor 46. The transistor 52 is cut off because the voltage drop across the base-emitter junction of the saturated transistor 41 is equal to or larger than that across the diode 54 being active as a threshold element. Consequently, the potential on the collector electrode of transistor 52 is less negative than that on the emitter electrode. Dependent on the value of the signal $23^{(1)}$ the transistor 56 may be either cut off or saturated. In the bottomed condition of the transistor 56 the emitter-collector current flows through the resistor 55.

In the signal 27 shown in FIG. 2 a negative going step of a trigger pulse occurs at the instant $t_{L0}$. The capacitor 59 together with the base-emitter circuit of the saturated transistor 41 and the resistors 44 and 47 forms a differentiating circuit wherein the capacitor 43 occurs as a short circuit. The result is that a short trailing pulse occurs at the junction of the capacitor 43, the base electrode of the transistor 41 and the collector electrode of the transistor 52. The stable state of the circuit arrangement is not influenced thereby so that no variation occurs in the signal 28.

The positive going step of the trigger pulse occurs at the instant $t_{L1}$ in the signal 27 of FIG. 2. The positive going step is impressed through capacitor 59 on the base electrode of the transistor 41 which transistor consequently tends to be cut off. The decreasing collector current of the transistor 41 results in a smaller voltage drop across the resistor 48. The negative going variation occurs through the capacitor 50 instantaneously at the base electrode of the transistor 42 so that this transistor is saturated. The resultant voltage drop across the resistor 44 renders the voltage at the base electrode of transistor 41 through capacitor 43 less negative. It is found that a snowball effect is obtained with the positive steps which are passed on by the capacitors 59 and 43. The transistors 41 and 42 stepwise change from one to the other operating condition. In the signal 28 of FIG. 2 this effect becomes manifest because a negative going step occurs at the instant $t_{L1}$. The signal generator 10 thus comes in its unstable state.

The positive going step which occurs at the collector electrode of the transistor 52 causes the transistor 52 to be saturated. The capacitor 43 is therefore arranged in a discharge circuit which includes a series arrangement of the transistors 42 and 52. The capacitor 43 is also slightly discharged across the resistors 47 and 44. The discharge current of the capacitor 43 in the discharge circuit (42, 43, 52) is controlled through the transistor 52 which is driven with the aid of transistor 56. A small negative value of the sawtooth pulse in the signal $23^{(1)}$ applied to transistor 56 causes a small discharge current of capacitor 43, while a more negative value causes a greater discharge current. The discharge of the capacitor 43 continues until the potential on the base electrode of the transistor 41 becomes slightly more negative than that on the emitter electrode. The difference between the said potentials is given by the junction voltage of the transistor 41. When exceeding the threshold voltage the transistor 41 attempts to conduct. The conducting condition of transistor 41 causes transistor 42 to be cut off. The resultant switching in the opposite sense of the transistors 41 and 42 results in the step shown at the instant $t_{L11}$ in the signal 28. The square-wave signal generator 10 thus returns to its stable state. It is achieved with the aid of the sawtooth pulse in the signal $23^{(1)}$ that square-wave signals having a varying pulse duration are produced in the signal 28.

The marker 32 shown in FIG. 3 is obtained in a television image with the aid of the signals 28, 29 and 30 shown in FIG. 2 which signals can be produced with the aid of the embodiment of the square-wave signal generators 10, 11 and 12 shown in FIG. 5. For the direction of the field and line deflection shown in FIG. 3 the decreasing pulse duration of the square-wave signals in the signal 28 not displayed on the display screen results in the tip of the marker 32 occurring as an arrow being directed to the left and downwards.

For producing an arrow directed to the right in a television image an embodiment of the square-wave signal generator 10 of FIG. 1 is given in FIG. 6 which generator is denoted by $10^x$. The square-wave signal generators 11 and 12 may maintain the embodiment described already with reference to FIG. 5. The components in the generator 10 already described with reference to FIG. 5 are denoted by the same reference numerals in the generator $10^x$ shown in FIG. 6. To explain FIG. 6 a few signals are shown therein. The signals 23 and 27 already described with reference to FIGS. 1 and 2 are applied to the generator $10^x$. A signal provided by the square-wave signal generator $10^x$ is denoted by $28^x$.

The square-wave signal generator $10^x$ has a switch 60. The switch 60 is formed with two change-over switches 61 and 62 which are coupled mechanically. The switch 60 may be manually operated directly or, as shown in FIG. 6, electromechanically. To this end the switch 60 is formed with a coil 63 which is connected in series with a single-pole switch 64 between the terminal $-V_1$ and ground. A diode 65 is connected parallel to coil 63 which diode is active as a damper for ringing phenomena when switch 64 is switched off.

The junction of the capacitor 59 and the base electrode of the transistor 41 in the square-wave signal generator $10^x$ is connected to a switching limb of the change-over switch 61. One of the two switching contacts of the change-over switch 61 is connected to the collector electrode of the transistor 52. The collector electrode of the transistor 56, the emitter electrode of which is connected to ground through a resistor 66, is connected to a switching limb of the change-over switch 62. One of the two switching contacts of the change-over switch 62 is connected through a resistor 67 to the base electrode of the transistor 52. The said switching contacts of the change-over switches 61 and 62 are both switched on or switched off at the same instant due to the mechanical coupling of the switching limbs in the switch 60. The other switching contacts of the change-over switches 61 and 62 are connected together through a resistor 68. This switching contact of the change-over switch 61 is then connected to the base electrode of the transistor 52 through a resistor 69 and to ground through a capacitor 70. A plus and a minus symbol are shown at the capacitor 70 likewise as at the capacitor 43.

If the switching limbs of the change-over switches 61 and 62 are connected to the switching contacts, which are connected to the collector and the base electrode of the transistor 52, the square-wave signal generator $10^x$ provides the signal 28 shown in FIG. 2. The square-wave signal generators 10 and $10^x$ shown in FIG. 5 and FIG. 6 do not have any essential differences at this position of the switch 60. In the other position of the switch 60 shown in FIG. 6 the square-wave signal generator $10^x$ produces the signal $28^x$ having square-wave signals of increasing pulse duration.

FIGS. 7 and 8 will be used for the explanation of the operation and the influence of the square-wave signal generator $10^x$ of FIG. 6.

FIG. 7 shows a transistor characteristic 71 of the transistor 41 of FIG. 6. The conjunction voltage $-V_{BE}$ and the base current $-I_B$ are plotted along two axes at right angles to each other at a given collector-emitter voltage drop $-V_{CE1}$. A time axis $t$ is plotted along the transistor characteristic 71.

In a similar manner as in FIG. 4, FIG. 8 shows a marker 72 produced in a television image which marker is obtained with the aid of the signal $28^x$ produced by the square-wave signal generator $10^x$ of FIG. 6. Two instants $t_1$ and $t_2$ are shown in the signals, 23, 27 and $28^x$ of FIG. 6 along the transistor characteristic 71 of FIG. 7 and at the marker 72 of FIG. 8.

In the position of the switch 60 shown in FIG. 6 the capacitor 59 is connected to ground through the capacitor 70. As is described with reference to FIG. 5 the trailing steps of the pulses in the signal 27 do not become manifest in the signal $28^x$. However, a short change is applied to the capacitor 59 through the emitter-base circuit of the transistor 41. The positively directed step at the periodically occurring instant $t_{L1}$ in the signal 27 is impressed through a voltage division across the capacitors 59 and 70 on the base electrode of the transistor 41 and causes this transistor to be cut off, during which transistor 42 is saturated. At the instant $t_{L1}$ indicated in signal 23 the voltage impressed on the base electrode of transistor 56 is, for example, not sufficiently negative to cause the transistor 56 to be saturated. The capacitors 43 and 70 are arranged in a discharge circuit which includes the transistor 42 and the resistors 44, 47, 55 and 69. The capacitor 70 having a comparatively high capacitance is slightly discharged while the capacitor 43 is quickly discharged. At the instant $t$indicated in the signals 23 and $28^x$ the potential on the base electrode of the transistor 41 has decreased so far that the transistor 41 is saturated during which transistor 42 is cut off. At the instant $t_1$ the potential on the base electrode of the transistor 41 has become equal to the more or less constant potential of the emitter electrode minus the junction voltage indicated by a broken line $-V_{BEO}$ in FIG. 7. After the instant $t_1$ capacitor 43 is charged whereafter transistor 41 conveys a constant base current $I_B$. The sum of the more or less constant voltage across the parallel arrangement of capacitor 46 and resistor 45 and the base-emitter voltage drop of the transistor 41 is then equal to the voltage across the capacitor 70. The direct current adjustment of the transistor 41 is thus fixed by the voltage across capacitor 70. The described adjusting point of the transistor 41 is indicated by $t_1$ in the transistor characteristic 71 of FIG. 7.

The instant $t_2$ is indicated in the signal 23 at which instant the transistor 56 is, for example, saturated. The transistor 56 causes a current to flow through the resistors 66, 68, 69 and 55 and the Zener diode 53. The current-dependent voltage drop across the series arrangement of the resistors 55 and 69 determines, with reference to the potential $-V_1$, the potential which is impressed on the terminal of capacitor 70 indicated by a minus symbol. Thus a controllable voltage source is connected parallel to the capacitor 70 which source mainly includes the controlled transistor 56, the resistor 55 and 69, the Zener diode 53 and the supply source $V_1$. The result is that the voltage across the capacitor is smaller about the instant $t_2$ than that about the instant $t_1$. The decrease is determined by the signal 23 applied to the base electrode of the transistor 56. In the saturated condition of the transistor 41 there applies that the base-emitter voltage drop must have decreased to an equal extent about the instant $t_2$. The direct current adjusting point of the transistor 41 has therefore changed and is denoted by $t_2$ in the transistor characteristic 71 of FIG. 7. The result for the capacitor 43 is that it is charged in the stable state of the generator $10^x$ up to a voltage which has increased by the same value.

A positively directed step occurring prior to the instant $t_2$ in the signal 27 is partially impressed on the base electrode of the transistor 41 due to the voltage division across the capacitors 59 and 70. The division is equal to that which occurred prior to the instant $t_1$. The result is that the capacitor 43 is charged to a higher voltage prior to the instant $t_2$ and it has a longer discharge period during which a broader pulse occurs in the signal $28^x$. The pulse duration variation in the signal $28^x$ is determined by the shape of the signal 23, the curvature of the transistor characteristic 71 of the transistor 41 and the proportioning of the capacitors 59, 43 and 70 and the associated discharge circuits. It is found in practice that a small variation of the voltage across the capacitor 70 of approximately a few tenths of one Volt is sufficient for a great pulse duration variation in the signal $28^x$. In one embodiment of a square-wave signal generator $10^x$ the following capacitances were found to yield a great pulse duration variation: capacitor 43 = 100 pF, capacitor 59 = 270 pF and capacitor 70 = 18 nF.

If a luminance signal Y composed of colour signals is available in a colour television system, the signal 29 of FIG. 1 could be superimposed as a marker signal on the luminance signal Y (signal 31). In a colour television image a black marker might occur in an equal manner as in monochrome television.

In a color television system there may alternatively be only the chrominance signals available, for example, the chrominance signals: R, G and B corresponding to the red, green and blue information of the image. FIG. 9 shows an embodiment of the superimposition stage 13 of FIG. 1 which is suitable for use in a colour television system wherein the chrominance signals R, G and B are available.

The superimposition stage 13 of FIG. 9 is provided with three input terminals $14_R$, $14_G$ and $14_B$ to which the chrominance signals are applied which are indicated by one signal 31R, G, B. The signals 29 and 30 are shown at two other input terminals connected to the line pulse shaper 9 of FIG. 1. To emphasize the difference between the superimposition stage 13 of FIG. 1 and that of FIG. 9, two plus symbols are indicated at the last-mentioned input terminals. The superimposition stage 13 applies the output signals to the output terminals $15_B$, $15_G$ and $15_R$ which signals are shown at these terminals. The signals 29 and 30 occur in a similar manner in the signals at the output terminals $15_R$ and $15_G$. Since the circuits between the terminals $14_R$, $15_R$ and $14_G$, $15_G$ have the same construction, one of them will be described. The terminals $14_B$ and $15_B$ are, for example, directly connected together.

The input terminal $14_G$ is connected to a base electrode of a pnp-transistor 73. An emitter electrode of transistor 73 is connected to ground through a resistor 74. A collector electrode of transistor 73 is connected through a resistor 75 to the terminal $-V_1$ and is connected through a Zener diode 76 to a base electrode of a pnp-transistor 77. An emitter electrode and a collector electrode of transistor 77 are connected through resistors 78 and 79 to ground and to the terminal $-V_1$, respectively. The collector electrode of the transistor 77 is connected to a series arrangement of a Zener diode 80 and a resistor 81 to ground while the junction in the series arrangement is connected to the output terminal $15_G$.

The signal 30 is applied to the junction in a series arrangement of a diode 82 and a resistor 83 which series arrangement is connected between the emitter electrode of the transistor 73 and ground.

There is indicated in the signal 31R, G, B that the picture content extending from the black level is less negative for higher values. For the higher values the current conductance through the transistor 73 decreases and increases through transistor 77. A signal which has the same phase as the signal 31G appears at the output terminal $15_G$. The Zener diodes 76 and 80 serve for the elimination of a level shift caused by the transistors 73 and 77 in the signals occurring at the terminals $14_G$ and $15_G$.

The pulse in the signal 30 commencing at the instant $t_{L12}$ and extending in a negative direction causes the transistor 73 to be less saturated. A pulse which locally increases the picture content to a maximum value occurs in the signal appearing at the output terminal $15_G$. A similar pulse appears in the signal occurring at the output terminal $15_R$ under the influence of the pulse in the signal 29 ending at the instant $t_{L12}$.

A marker appearing as an arrow is produced in a colour television image on a display screen with the aid of the superimposition stage 13 shown in FIG. 9 in a circuit arrangement according to FIG. 1 which marker comprises a bright (more or less saturated) red and a green portion.

If a reduction to black level instead of an enlargement of the picture content in the signal 31R or 31G would have been performed, the instantaneously uninfluenced chrominance signals determine the colours of the arrow. A displacement of the marker occurring as an arrow in a colour television image having many hues is accompanied by a variation in the colours of the arrow. The result is a very conspicuous and colourful indication which, however, has been found to be slightly tiring for some observers.

I claim:

1. A marker circuit for a television system providing line and field frequency synchronization signals and a video signal, said circuit comprising a field pulse generator having an input means for receiving said field synchronizing signal, and an output means for generating pulses of field frequency having an adjustable duration;

a field pulse shaper means having an input coupled to said field pulse generator output, and first and second output means for producing first and second pulse trains of field frequency respectively, at least said first train having pulses of varying amplitude; a line pulse generator having an input means for receiving said line synchronizing signals, and an output means for generating line frequency pulses having an adjustable duration; a line pulse shaper means for generating at least a first train of line frequency pulses reoccuring at the field frequency, said line pulse shaper comprising at least first and second serially coupled square wave generators, for generating square wave pulses, each of said square wave generators having an input and an output, means for coupling said first square wave generator input to said line pulse generator output means, means for coupling said first square wave generator output to said second square wave generator input, each of said square wave generators having a control input means coupled to the field pulse shaper first output means for varying the duration of the generated pulses of said square wave generators; means for superimposing pulses from said second square wave generator onto the video signal to produce a marker, said superimposing means having a first input means for receiving said video signal, a second input means coupled to said second square wave generator output, and an output means for providing said video signal with said marker superimposed thereon; and gating means having a first input coupled to said field pulse shaper second output to receive said second pulse train as a gating signal for controlling the occurrence of pulses superimposed on said television signal during a given field interval; and means for coupling said gating means in series with said line pulse generator, said line pulse shaper, and said superimposing means.

2. A circuit arrangement as claimed in claim 1 wherein said line pulse shaper further comprises a third square-wave signal generator means for generating a second train of line frequency square wave pulses and having an input coupled to said second square-wave generator output, an output, and a control input means coupled to said field pulse shaper first output for varying the pulse duration of said third generator pulses, said superimposition means having a third input coupled to said third generator output.

3. A circuit arrangement as claimed in claim 2 wherein said superimposing means third input comprises an inverting input, whereby said marker signal comprises square-wave signals of opposite polarity.

4. A circuit arrangement as claimed in claim 2 wherein said video signal comprises at least two chrominance signals, and said superimposing means comprises means for increasing the instantaneous value of the chrominance signals in accordance with said marker.

5. A circuit arrangement as claimed in claim 4 wherein said chrominance signals comprise red and green color signals.

6. A circuit arrangement as claimed in claim 1 wherein said first field pulse train comprises a sawtooth signal.

7. A circuit arrangement as claimed in claim 1 wherein said first field pulse train comprises a nonlinearly varying signal.

8. A circuit arrangement as claimed in claim 1 wherein said square-wave signal generators each comprises a monostable multivibrator circuit having a capacitor, and means for varying the charge of said capacitor in accordance with said first field pulse train.

9. A circuit arrangement as claimed in claim 1 wherein said gating means has an input means for directly receiving said line frequency synchronizing signal and an output means directly coupled to said line pulse generator.

* * * * *